Nov. 27, 1934.   H. L. READ   1,982,020

TABULATING MACHINE

Filed Nov. 10, 1931   5 Sheets-Sheet 1

INVENTOR
Harold L. Read
BY his ATTORNEY

Nov. 27, 1934.  H. L. READ  1,982,020
TABULATING MACHINE
Filed Nov. 10, 1931  5 Sheets-Sheet 2

INVENTOR
Harold L. Read
BY his ATTORNEY

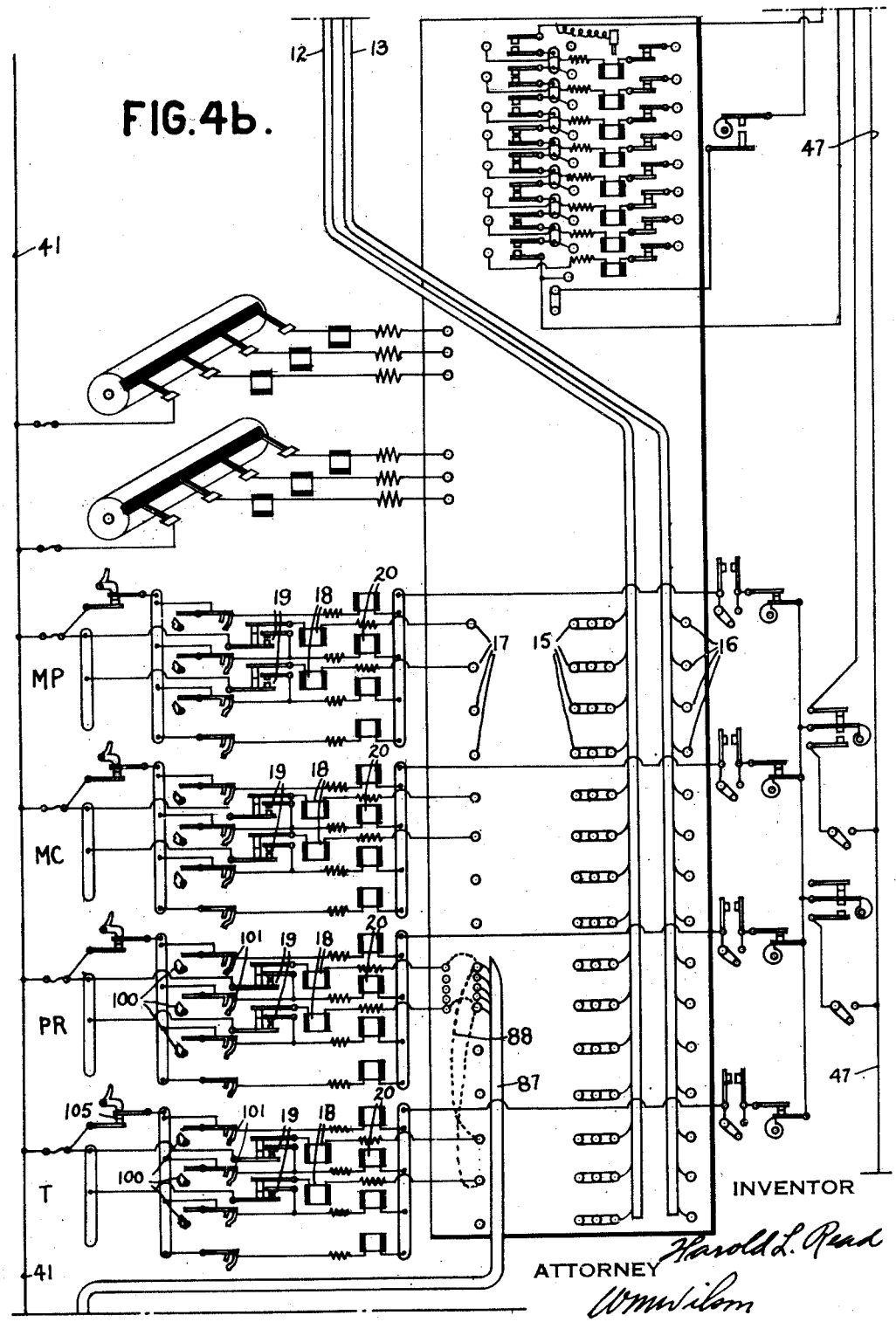

Nov. 27, 1934.　　　H. L. READ　　　1,982,020

TABULATING MACHINE

Filed Nov. 10, 1931　　5 Sheets-Sheet 5

INVENTOR
Harold L. Read
BY his ATTORNEY

Patented Nov. 27, 1934

1,982,020

UNITED STATES PATENT OFFICE 1,982,020

TABULATING MACHINE

Harold L. Read, Endicott, N. Y., assignor, by mesne assignments, to International Business Machines Corporation, New York, N. Y., a corporation of New York Application November 10, 1931, Serial No. 574,212

5 Claims. (Cl. 235—92)

This invention relates to means for accomplishing multiplication in calculating machines such for instance as the tabulating machine disclosed in Patent No. 1,762,145, issued to G. F. Daly et al., dated June 10, 1930.

An object of the invention is to provide multiplicand and multiplier indicating devices settable under control of perforated record cards which devices control electric circuits for causing repeated entry of the amount in one of the devices into a product accumulator.

Another object of the invention is to provide means for printing the factors of a computation concurrently with the entry of the factors into settable devices which in turn control the printing of the result of the computation.

In its preferred form the invention comprises a pair of record controlled indicating setup devices into which a multiplicand and multiplier are entered. One of the settable devices, preferably the one which receives the multiplicand, is provided with electrical read-out commutators whose denominational orders may be connected seriatim with the denominational orders of an accumulator for repeated entry therein. The electrical connections between the multiplicand setup device and the product accumulator are controlled through a column selecting mechanism shiftable under control of the multiplier setup device. After entries have been made in the multiplier and multiplicand counters, successive adding cycles are performed during which the multiplicand is repeatedly entered into the product accumulator, the units order of the multiplier being successively stepped back one unit for each entering operation to its initial or zero position at which time the column selecting device is controlled to cause further entry of the multiplicand to occur in successively higher orders in the product. During such entry the tens order of the multiplier is successively stepped back to zero and column shifting again takes place to cause further entry of the multiplicand a number of times represented by the value of the hundreds order of the multiplier.

When all orders of the multiplier have been returned to zero, adding operations will cease and the multiplicand setup device will be automatically zeroized in preparation for a further entry from another perforated record card. Prior to the resetting of the multiplicand setup device the product accumulator will automatically cause printing of the amount standing therein after which it will be reset together with the multiplicand setup device.

If desired, the entry of amounts from the multiplicand to the product accumulator may be duplicated to cause the same entry to be made in a grand total accumulator which will progressively accumulate the several products as they are computed by the machine.

Figure 4A:
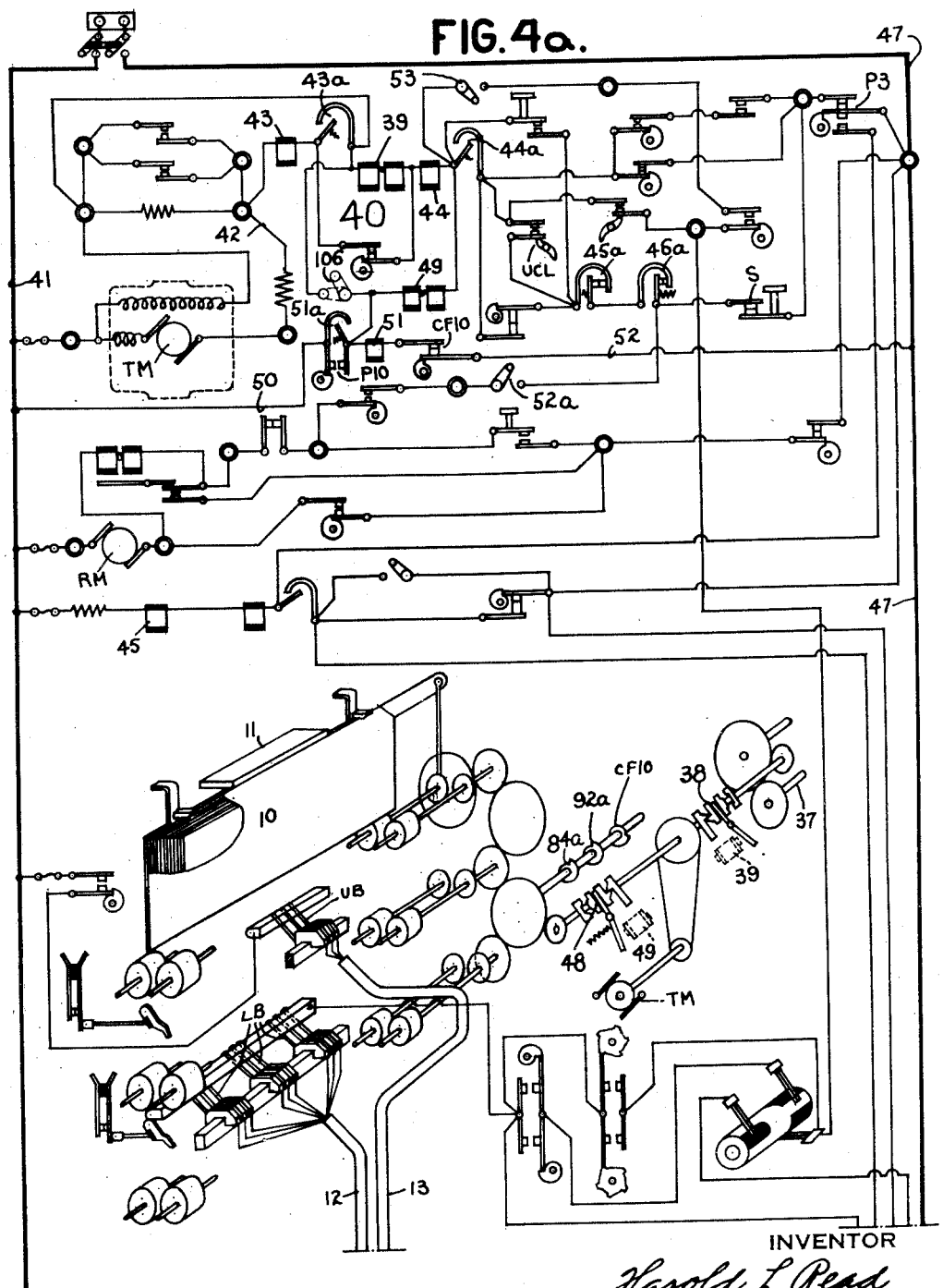
Figure 4C:
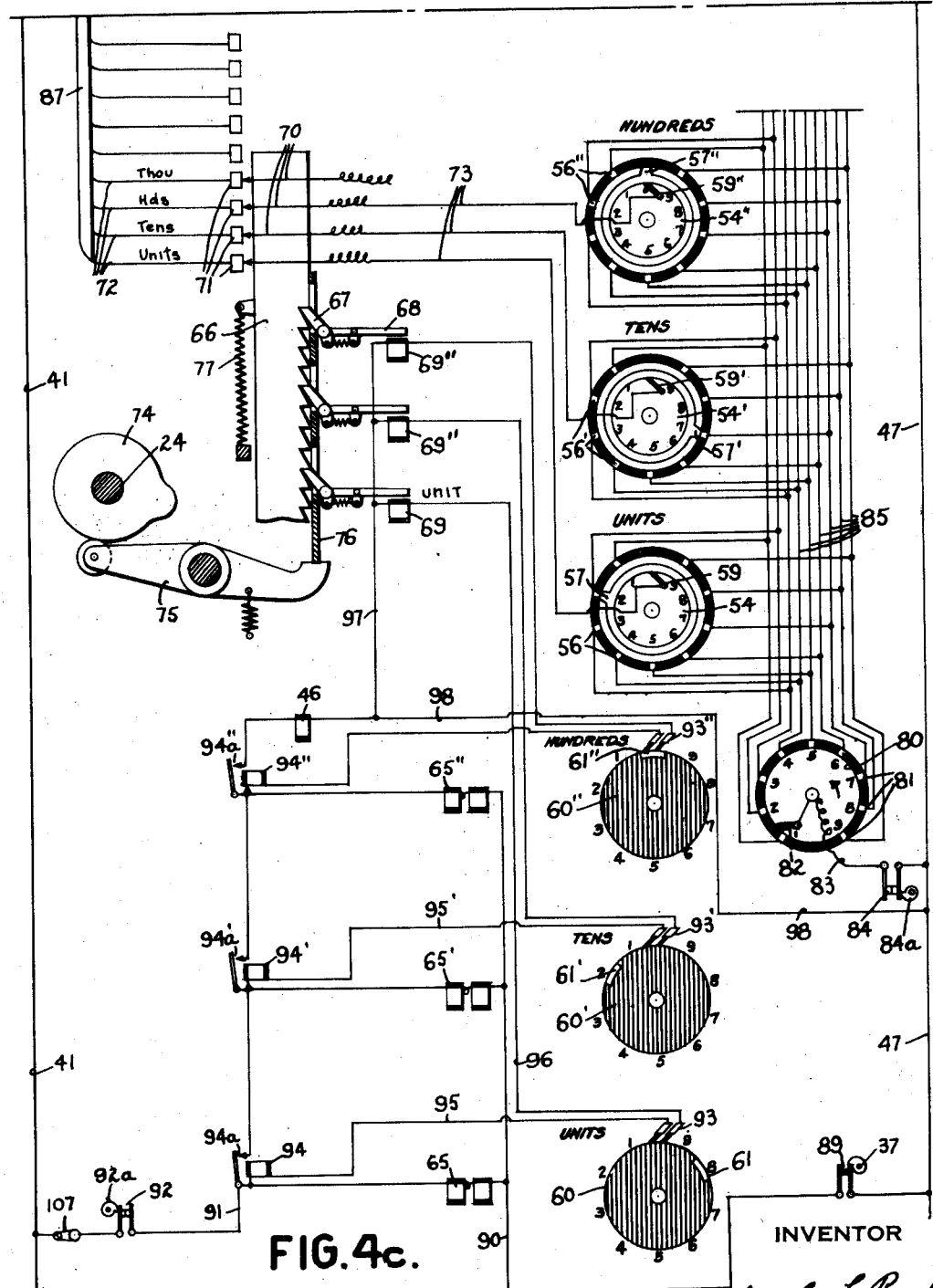

Figs. 4a, 4b and 4c taken together comprise a complete wiring diagram of the electric circuits of the machine.

A brief description will first be given of the general operation of the tabulating machine to which the invention may be applied.

Referring to the diagram (Fig. 4a) the record cards are successively fed from a stacker 10 one at a time by means of a picker 11 into engagement with the usual feed rollers which advance them to the usual discharge stack. The cards are advanced past the upper analyzing brushes UB and exactly one machine cycle later past lower analyzing brushes LB. Suitable wires are here shown cabled and indicated at 12 and 13 which respectively connect the lower and upper brushes with plug sockets on the tabulator plug board 14 (Fig. 4b). These sockets are indicated at 15 and 16, the former for the lower brush positions and the latter for the upper brushes. The plug board also includes sockets 17 which are connected to the counter magnets 18.

At the upper end of the plug board there is shown the circuit diagram of the usual automatic control and group indicating unit. In Fig. 4b the counters have been diagrammatically illustrated. Counter MP is the multiplier counter, MC, the multiplicand counter, PR, the products counter, and T, the grand total counter.

Figure 2:
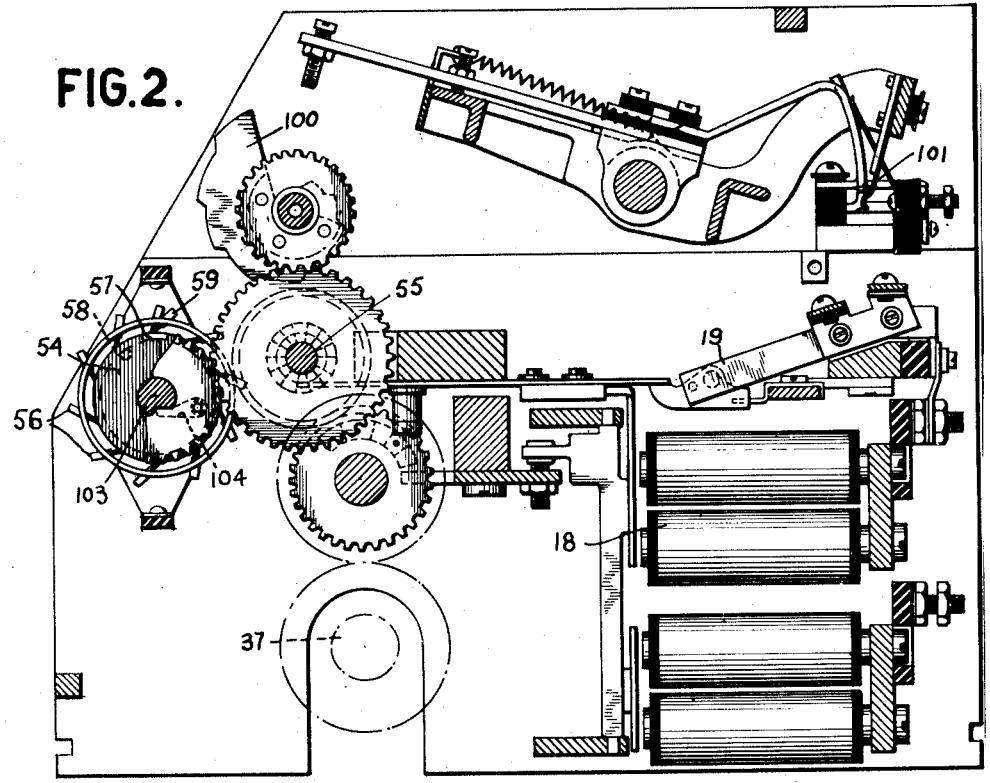
Fig. 2 is a sectional view taken through the multiplicand setup device.

As the perforated cards pass the lower brushes their index points instantaneously close circuits through the proper lower analyzing brushes LB to energize counter magnets 18 (see Fig. 2). As usual the timed energizations of these magnets control mechanism for entering the data corresponding to the card reading on the counter wheels. When any magnet 18 is energized, it causes contacts 19 (Fig. 4b) to close energizing a printer magnet 20 to select the type corresponding to the entered data for printing. In this fashion the accumulated or entered items may be listed.

Figure 1:
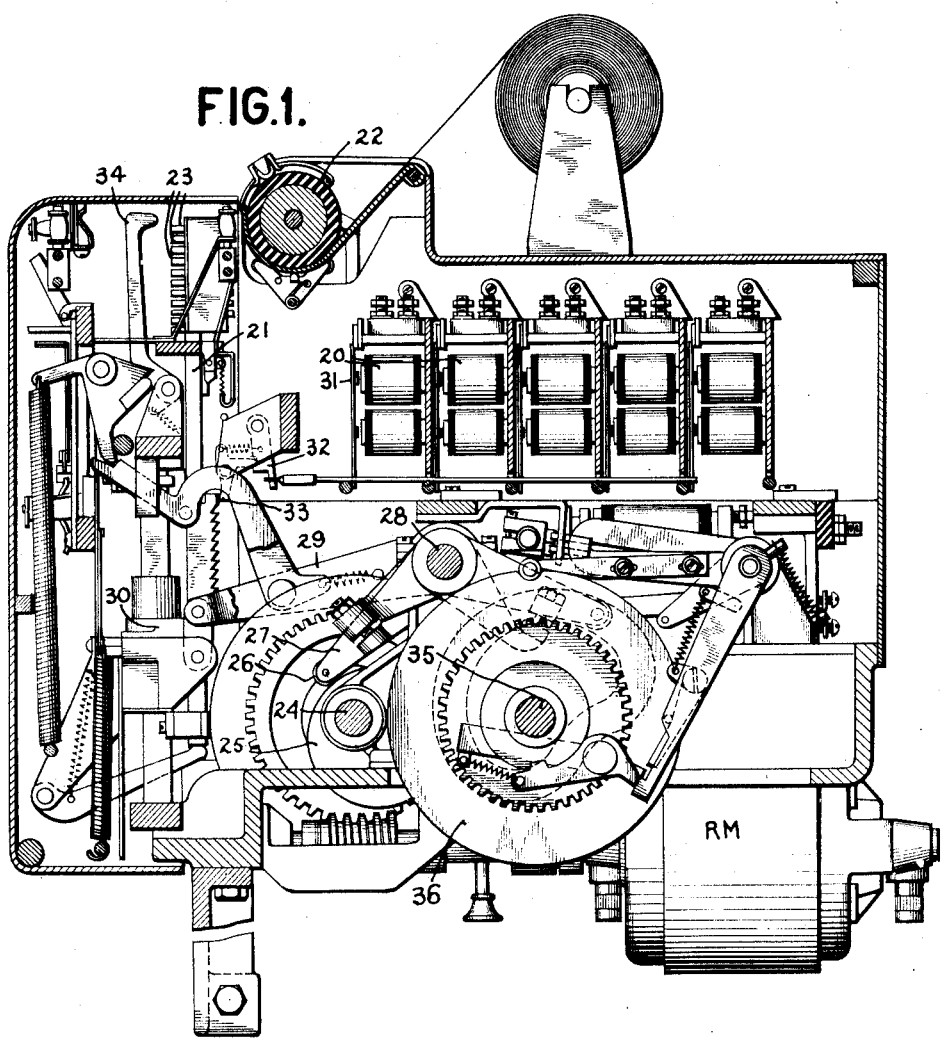
Fig. 1 is a section through the printing mechanism of the machine.

In Fig. 1 is shown the printing mechanism through which the type bar 21 is positioned relatively to the platen 22 to bring the proper type 23 opposite the platen. The total shaft 24 driven by the reset motor RM is provided with a cam 25 cooperating with a roller 26 carried by an arm 27 operatively connected to a shaft 28.

As the cam rotates, shaft 28 is rocked in a clockwise direction and an arm 29 secured thereto and linked at its free end to printing crosshead 30 serves to raise the type bars 21 in synchronism with the total taking mechanism so that the type 23 successively pass printing position opposite platen 22. The type bar 21 is arrested under control of printing magnet 20 which when energized attracts its armature 31 and through a call wire releases latch member 32 normally holding stop pawl 33. When the pawl is so released it is spring operated to engage the ratchet teeth formed on the type bar 21 to prevent further upward movement of the type bar, thus holding a particulalr type 23 in printing position. The usual hammers 34 are provided to impel the type against the platen.

A list shaft 35 is provided with a box cam 36 which through suitable follower arm connections is also adapted to rock shaft 28 to cause reciprocation of the printing crosshead 30. Shaft 35 (see also Fig. 4a) is driven from the counter drive shaft 37 by the usual tabulating motor TM through suitable gearing under control of the usual one revolution clutch generally designated 38 which is controlled by a magnet 39.

During tabulating operations the machine is driven by the motor TM controlled by a group of relays and contacts generally designated 40. The circuit which serves to maintain the motor TM in operation is as follows: From left side of line 41, through motor TM, wire 42, motor relay 43, points 43a, now closed, clutch magnet 39, start relay 44, its points 44a, also closed, lower card lever contacts LCL, and upper card lever contacts UCL, automatic control relay points 45a, points 46a, stop key S, contact P3, to right side of line 47.

The circuit just traced is the usual one for maintaining the motor TM in operation as long as cards continue to feed through the machine to hold contacts UCL closed.

In the patent referred to the card feeding devices were normally coupled to the tabulating mechanism so as to feed a card for each operation of the tabulating mechanism. In the present instant a clutch device 48 is provided which is adapted to be controlled by a magnet 49 to disconnect the card feeding mechanism from the drive of the motor TM regardless of the setting of clutch 38.

It may here be mentioned that prior to the initiation of any tabulating operations in this type of machine it is customary to perform a reset cycle of operations to insure that all the accumulators are in cleared condition.

During this cycle a cam contact P10 carried by the total and reset shaft 24 is adapted to close momentarily to establish a circuit from line 41 through a wire 50, contacts P10, relay 51, cam contact CF10, closed at this time, wire 52, to other side of line 47. This energizes relay 51 to close its points 51a thus forming a stick circuit for the relay.

Upon subsequent completion of the tabulating motor circuit a parallel circuit will be established from line 41, through wire 50, relay points 51a, now closed, card feed clutch 49, to relay points 44a and thence to line 47 through the same circuit as traced for the motor TM. Thus both the tabulating mechanism and the card feed will be simultaneously clutched for synchronous operation. During this operation the cards will feed past the brushes and readings will be taken therefrom.

During the first cycle of operation of the card feed a cam contact CF10 is adapted to open momentarily to interrupt the holding circuit of relay 51a which will thereupon permit its points 51a to open and break the card feed clutch magnet circuit. Thereafter the tabulating mechanism will continue to operate and the card feed will come to and remain at rest.

During the card feed cycle entries are made into the proper counters and following this the independent operation of the tabulating mechanism will continue until the completion of the computation initiated by the record card sensed. When this computation is completed relay points 46a will be automatically opened in a manner to be explained, which will interrupt the tabulating motor and clutch circuit to bring the machine to a stop or if the automatic reset switch 52a is closed, a circuit will be completed through the reset motor RM in the well-known manner to cause a total printing and reset cycle of operations to follow immediately.

During this cycle of operations data may be printed from such of the accumulators as are suitably connected for printing and during this cycle the closure of contacts P10 will again set up the stick circuit through relay 51 to place card feed clutch magnet 49 in condition to be energized concurrently with tabulating clutch magnet 39 and motor TM upon re-initiation of tabulating operations which will take place automatically, provided automatic start switch 53 is closed. The manner in which this circuit is automatically re-established is fully dealt with in the patent referred to and requires no specific tracing here.

The multiplicand setup device is shown in Fig. 2 wherein a commutator 54 is shown mounted in the place of the usual counter index wheel. Commutator 54 is driven from the counter clutch shaft 55 to which it is coupled in the well-known manner upon energization of magnet 18. Displaced about the periphery of commutator 54 are a number of brushes 56 which cooperate with a segment 57 of the commutator. As the commutator is rotated during the entry of an item, segment 57 will move past the brushes 56 in succession and will come to rest in contact with the brush corresponding to the number entered into the commutator. Segment 56 is connected to a collector ring 58 cooperating with a brush 59 so that current entering brush 59 will pass through collector ring 58, segment 57, and out through the brush 56 with which the segment is in cooperation at the time.

Figure 3:
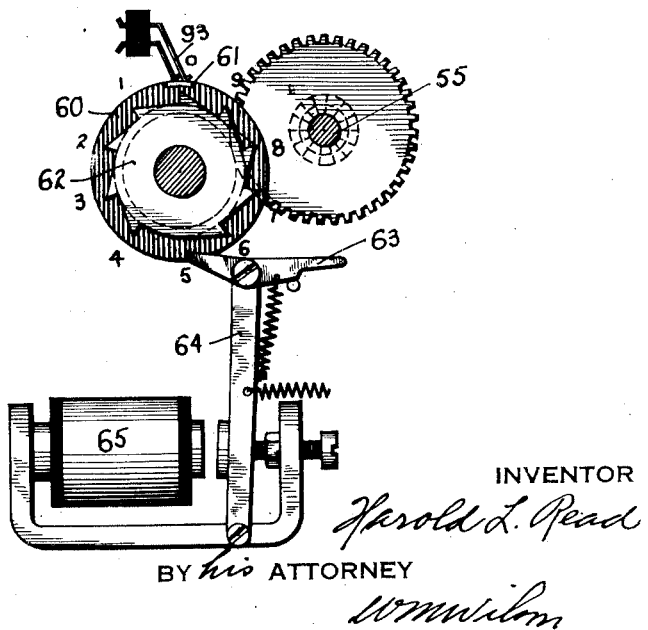
Fig. 3 is a detail of a multiplier setup device commutator and operating magnet.

In Fig. 3, a commutator 60 represents one column of the multiplier setup which is also driven from the clutch shaft 55 in the same manner as commutator 54. Commutator 60 carries a conducting segment 61 which is displaced during the entry of an item, an angular distance corresponding to the value of the entered item. Thus upon entry of a 5 a segment 61 will be displaced 180 degrees from the position shown in Fig. 3. Commutator 60 has secured thereto a ratchet 62 which is actuated in a clockwise direction by spring-pressed pawl 63 which is carried by spring-pressed pivoted armature 64 of a magnet 65. For each energization of magnet 65 pawl 63 will be moved to the left into engagement with ratchet 62 to advance segment 61 one step toward its zero or restored position. The ratchet tooth with which pawl 63 cooperates when the segment is in restored position is omitted so that after the commutator has been restored, further energization of magnet 65 will not disturb it.

The column selecting device is shown diagrammatically in Fig. 4c and comprises a plate 66 provided with ratchet teeth along one edge which cooperate with spring-pressed pawls 67 carried by magnet armatures 68 of magnets 69. Plate 66 carries a plurality of electrical connectors 70 insulated therefrom and adapted to make contact with a series of relatively fixed contacts 71 which are connected to the plug board 14 (Fig. 4b) by means of wires 72. Connectors 70 are connected through wires 73 to brushes 59, 59' and 59'' of commutators 54, 54' and 54''. In Fig. 4c the brushes 56, 56' and 56'' have been shown as contact blocks and are adapted to cooperate with the segments 57, 57' and 57''.

In Fig. 4c, the plate 66 is in position connecting the units wire 72 with the wire 73 of the units commutator 54. Energization of a magnet 69 will move plate 66 upwardly an amount equal to the distance between two contact blocks 71 in which position it will be held by pawls 67. The units wire 73 will now be in connection with the tens wire 72 and the tens wire 73 will be in contact with the hundreds wire 72. Further upward movement of plate 66 upon energization of another magnet 69' will bring the units wire 73 into contact with the hundreds wire 72, the tens wire 73 into contact with the thousands wire 72 and so on. After the computation has been completed and the machine has entered upon a total printing and reset cycle, a cam 74 carried by the total and reset shaft 24 is adapted to rock a spring-pressed pivoted lever 75 to raise a plate 76 upwardly. The plate is adapted to engage the several pawls 67 and rock them out of engagement with the ratchet teeth on plate 66, thus permitting the plate 66 to be drawn downwardly to its initial position of Fig. 4c under the influence of its spring 77.

The circuit diagram will now be explained with reference to the solution of a specific problem.

Take, for instance, the multiplicand 72 and a multiplier 28. These two values are perforated on a record card and are entered therefrom into their respective setup devices MC and MP in the same manner in which items are set up on the indicating wheels in the counters of the patent referred to. After the passage of the card by the lower brushes the commutators 54, 54', 54'' and 64, 64', 64'' will be displaced as shown in Fig. 4c wherein the units commutator 54 has its segment 57 in contact with the "2" spot 56, the units commutator 60 has its segment 61 displaced eight steps in a counterclockwise direction away from its home position and the tens segment 61' is displaced two steps from normal. During the reading-in of these factors into their respective setup devices, the contact CF10 will open to interrupt the further card feeding operations in a manner already explained. The machine is now ready to begin its multiplying operations.

An impulse emitter 80 provided with a series of insert segments 81 is adapted to be traversed by a brush 82 mounted on counter shaft 37 which is adapted to cooperate successively with the insert segments 81 in synchronism with the entering cycle of the counters. Brush 82 is connected by means of a wire 83 and contact 84 to the right side of line 47 and as the brush rotates it will successively connect a series of wires 85 to line 47. During the first revolution of brush 82, which turns in a counterclockwise direction as indicated by the arrow, engagement of the brush with "2" segment 81 will complete a circuit at that time as follows: line 47, contact 84, wire 83, brush 82, "2" segment 81, the "2" wire 85, through a wire 86 connected to the "2" spot 56 of the units commutator 54 through the segment 57, collector ring, to brush 59, units wire 73, units wire 72, cable 87, to the units counter magnet 18 of the product counter PR, and thence to left side of line 41. Through suitable plug wires 88 the same entry may be made in grand total counter T. In this manner a "2" is entered in the units position of the counters PR and T.

Previously in this same cycle at the time brush 82 engaged segment "7" 81, a similar circuit was established through the tens commutator 54' to enter the "7" standing thereon into the tens orders of the counters PR and T. Thus at the end of this first computing cycle the number "72" will have been entered into the counters. Immediately following the entering portion of this cycle a cam contact 89 operated by a cam on counter shaft 37 will close momentarily to complete a circuit from line 47, contact 89, wire 90, units step-back magnet 65, wire 91, contact 92, now closed, to left side of line 41. Energization of magnet 65 will step back the units commutator 60 so that its segment 61 is now but seven steps from the starting position.

During the next revolution of the counter shaft the amount "72" will again be entered into the same orders of the counters PR and T through the same circuits and at the end of this cycle the momentary closure of contact 89 will cause units commutator 60 to be stepped back another step and this same cycle of operations will be repeated until eight successive entries of "72" have been made into the counters, during the last of which segment 61 of the units commutator 60 will have been returned to its zero position wherein it bridges a pair of brushes 93 causing the establishment of a circuit from line 41, contact 92, wire 91, relay coil 94, wire 95, brushes 93, wire 96, units magnet 69, wires 97 and 98, to line 47.

Energization of magnet 69 will advance plate 66 to connect the wires 73 to the wires 72 representing the next higher denominational orders. Energization of relay coil 94 will close its points 94a so that the next closure of contacts 89 will complete a circuit from line 47, contacts 89, wire 90, tens step-back magnet 65', relay points 94a, wire 91, contact 92, to line 41 to step back the tens commutator 60'.

During this entering cycle the amount "72" is entered into the counters PR and T one denominational order higher, that is the "2" will be entered into the tens order and the "7" into the hundreds order so that in effect "720" has been entered into the counters.

A second entry of 720 will be made during the following cycle during which also the tens commutator 60' will be restored to zero causing bridging of its brushes 93' and the completion of a circuit from line 41, contact 92, relay points 94a, now closed, tens relay 94', its wire 95', brushes 93' to the tens magnet 69', back to the line 47 as before. Plate 66 is thus advanced to connect wires 73 to the next higher wires 72. Since no entry has been made in the hundreds commutator 60' a parallel circuit will immediately be established through the tens relay points 94'a to energize the hundreds relay 94", causing closure of the hundreds points 94"a. Upon closure of all three relay points 94a, 94'a, and 94"a a circuit will immediately be completed from line 41, contacts 92, serially through contacts 94a, 94'a and 94"a, control relay 46, wire 98, to line 47.

Energization of relay 46 will cause opening of its points 46a (see Fig. 4a) in the motor circuit which opening will cause interruption of these circuits and if automatic reset switch 52 is closed, a total printing and reset cycle of operations will take place during which the usual stepped cams 100 (see Fig. 2) control the closure of contacts 101 timed with the rising of the type bars to select the proper type for printing the product. During this reset cycle index shaft 103 (Fig. 2) is turned one revolution in a counterclockwise direction during which a groove thereon will cooperate with the usual pawls 104 carried by the commutators to restore the latter to home position.

Printing from the grand total counter T may be suppressed by opening of contacts 105 (Fig. 4b) which will prevent completion of the circuits to contacts 101. Up to this point the record will appear as a printed line $$72 \times 28 = 2016$$

the multiplicand and product counters will have been zeroized, and the grand total counter will still contain the product.

Another card feed cycle will now automatically take place under control of the circuits traced above during which new multiplicands and multipliers are set up in their respective devices and a new series of computing cycles will take place.

Contacts 84 and 92 are controlled by contact cams 84a and 92a respectively which are carried by the card feed mechanism as shown diagrammatically in Fig. 4a. These contacts are adapted to be opened during the card feeding cycle to prevent undesirable back circuits. After the number of computing cycles determined by the value of the multiplier have been completed the product will again be printed and the total print and reset and new card feed cycles will follow in order.

After the cards have been exhausted, the machine will automatically come to stop and if desired, the grand total counter T may be coupled to the reset shaft in the usual manner and a manual total print and reset operation initiated to cause printing of the progressive or grand total of the several products and the clearing of the counter T.

The multiplying devices of the machine may be disabled if so desired so that the machine may be operated as a tabulator in the normal manner. To this end a switch 106 (Fig. 4a) is provided, which when moved to its closed or dotted line position will bring card feed clutch magnet 49 into a circuit parallel to that of clutch magnet 39 so that both magnets will be controlled together. Opening of a second switch 107 (Fig. 4c) will disable the relay control circuits.

With the switches 106, 107 so set, cards may be run through the machine for successive entry into the counters in the manner fully set forth in the patent referred to above. The MC and MP devices may be used to receive entries from the first card of each group under control of the group indicating mechanism, these entries being total printed therefrom under control of the stepped cam mechanism associated with the two devices.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

I claim:

1. In a machine of the class described, means for analyzing a perforated record card, multi-denominational multiplier and multiplicand set-up devices controlled thereby to receive muti-denominational setups, means for repeatedly adding the amount contained in one of said devices, means controlled by the other device for determining the number of repetitions of adding to be performed and means controlled by said multiplier setup device for causing the automatic restoration of said multiplicand setup device upon completion of a multiplication.

2. In a machine of the class described, means for analyzing a perforated record card, multiplier and multiplicand setup devices controlled thereby, adding mechanism, electric circuits for causing the repeated transfer of the amount contained in one of said devices to said adding mechanism, and means controlled by the other device for determining the number of transfer operations to be performed.

3. In an accounting machine having card handling and card analyzing means for handling and analyzing records one by one in succession, means for suppressing the operation thereof temporarily after each record is analyzed, and means for causing repeated addition of certain of the analyzed data a number of times in accordance with the value of other analyzed data carried by the same card.

4. In a machine of the class described, means for analyzing a perforated record card, multiplier and multiplicand setup devices controlled thereby, adding mechanism, connecting circuits for repeatedly entering the amount contained in one of said devices into said adding mechanism, means controlled by the other device for changing the position of said entering circuits relative to said adding mechanism to different denominations and further means controlled by said other device for causing the automatic restoration of said multiplicand setup device upon completion of a multiplication.

5. In a machine of the class described, means for concurrently analyzing a plurality of multi-denominational fields of a record card for data representative of a multiplier and a multiplicand, a pair of setup devices controlled by said analyzing means to concurrently receive a multi-denominational multiplier and a multi-denominational multiplicand, an accumulator, means automatically initiated upon completion of said entries for causing the repeated entry into said accumulator of said multiplicand, a number of times equal to the sum of the digits of said multiplier and column shift mechanism controlled by the multiplier setup device to allocate the repeated entries to the appropriate denominational orders of the accumulator.

HAROLD L. READ.